(12) United States Patent
Zueger (10) Patent No.: US 7,420,740 B2
(45) Date of Patent: Sep. 2, 2008

(54) DEVICE FOR COMBINATION OF LIGHT OF DIFFERENT WAVELENGTHS

(75) Inventor: Othmar Zueger, Triesen (LI)

(73) Assignee: OC Oerlikon Balzers AG, Balzers (LI)

( * ) Notice: Subject to any disclaimer, the term of this patent is extended or adjusted under 35 U.S.C. 154(b) by 370 days.

(21) Appl. No.: 11/126,989

(22) Filed: May 11, 2005

(65) Prior Publication Data

US 2006/0256445 A1    Nov. 16, 2006

(51) Int. Cl.
*G02B 27/10* (2006.01)
*G02B 27/14* (2006.01)
*G02B 27/12* (2006.01)

(52) U.S. Cl. .................. 359/618; 359/634; 359/639

(58) Field of Classification Search .................. 359/618, 359/634, 636, 637, 638, 639
See application file for complete search history.

(56) References Cited

U.S. PATENT DOCUMENTS

| | | | |
|---|---|---|---|
| 5,654,775 | A | 8/1997 | Brennesholtz |
| 2002/0097347 | A1 | 7/2002 | Shiue |
| 2005/0087678 | A1* | 4/2005 | Katayama .................. 250/226 |

FOREIGN PATENT DOCUMENTS

| | | |
|---|---|---|
| DE | 195 05 988 A1 | 2/1995 |
| DE | 68921496 T | 7/1995 |
| EP | 0869390 | 7/1998 |
| EP | 0946065 | 9/1999 |
| EP | 1 014 693 A2 | 6/2000 |
| EP | 1465437 | 10/2004 |
| EP | 1471746 | 10/2004 |
| WO | WO0143113 | 6/2001 |

OTHER PUBLICATIONS

Baumeister P Ed Society for Information Display: "P-58: Reflections with Phase Compensation For a Reflective LC Color Projective System", 1998 SID International Symposium Digest of Technical Papers, Anaheim, CA, May 17-22, 1998, SID International Symposium Digest of Technical Papers, Santa Ana, CA : SID US, Bd. vol. 29, May 17, 1998, Seiten 679-681, XP000792562 ISSN: 0098-966X Spalte 2, Absatz 2.

* cited by examiner

*Primary Examiner*—Ricky Mack
*Assistant Examiner*—Brandi N Thomas
(74) *Attorney, Agent, or Firm*—Notaro & Michalos P.C.

(57) ABSTRACT

The present invention relates to a method for combining or for splitting the beam paths of substantially nonpolarized light of at least three different wavelength intervals. The splitting or the combining of the beam path of light of those wavelength intervals located between the other wavelength intervals takes place when the beam paths of the light of the two other wavelength intervals are already or still combined. The present invention also relates to an illumination unit comprising a white light source and utilizing this method by means of interference filters for splitting the white light into red, blue and green light beams. The invention also relates to an illumination unit comprising a red, green and blue light source and utilizing these methods by means of interference filters for the combination of the beam paths of the light sources.

6 Claims, 9 Drawing Sheets

Fig 7

DEVICE FOR COMBINATION OF LIGHT OF DIFFERENT WAVELENGTHS

BACKGROUND AND FIELD OF THE INVENTION

The present invention relates to a device for combining light of different wavelengths. The invention relates in particular to an illumination unit with the capability of combining light from red, green and blue narrowband light sources into white light. However, the invention also relates to an illumination unit with the capability of splitting white light into red, green and blue subbeams.

Projectors currently in use which build on the projection of light for image generation can essentially be divided into 2 categories: those which provide for each of the three color channels red (R), green (G) and blue (B) with one imaging element each (3P Projectors=3 Panel Projectors). To the red color channel is assigned light with wavelengths within the wavelength interval of 600 nm to 780 nm. To the green color channel is assigned light with wavelengths within the wavelength interval of 500 nm to 600 nm. To the blue color channel is assigned light with wavelengths within the wavelength interval of 420 nm to 500 nm.

However, there are also those projectors which work with only one imaging element and operate color sequentially (CS Projectors=Color Sequential Projectors).

A further classification can be based on the manner in which the imaging element modulates light in order to pass on image information. A widely established class of image producing elements subjects the incident light to a locally resolved polarization modulation. This polarization modulation is subsequently transferred into an intensity modulation by means of polarization-selective optical elements. This type of imaging element must be impinged by polarized light. However, the focus of the present description are illumination devices for another class of imaging elements, which can be impinged by nonpolarized light or by light only partially polarized. The illumination devices required for this purpose should have the capability of preparing nonpolarized light for impingement. If broadband white light sources are utilized in 3P projectors, the white light must first be split into the three colors red, green and blue. One possibility of carrying this out is the utilization of dielectric edge filters. An edge filter has the task of reflecting nearly 100% of light in a first wavelength range, while it should transmit nearly 100% of the light in a second adjacent wavelength range. The region in which the wavelength ranges adjoin is denoted as a filter edge. If a first edge filter with a filter edge at 500 nm is placed into the beam path of a white light source, the blue light assigned to the blue color channel is first split from the yellow light. Yellow light in this case is additively combined green and red light. If an edge filter with an edge at 600 nm is placed into the beam path of the yellow light, green light is split from red light.

The implementation of the particular edge filter determines which wavelength range is reflected or transmitted. An edge filter which transmits the wavelength range with the shorter wavelengths, while the longer wavelengths are reflected, is generally referred to as shortpass filter. An edge filter which reflects the wavelength range with the shorter wavelengths while transmitting the longer wavelengths, is referred to as longpass filter.

If narrowband light sources, such as for example the light from LEDs, are utilized in CS projectors, the illumination configuration has the task of joining the light paths of a red, green and blue narrowband light source and to direct the light beams onto the one imaging element. Edge filters can again be employed: a first filter which, for example, combines the light path of the red and of the green light and a second one, which combines the light path of the blue light with the two other light paths.

A problematic aspect is the fact that light from white light sources as well as also light of narrowband LEDs, as a rule, does not supply polarized light, but in any event incompletely polarized light.

Edge filters are, however, typically realized by means of dielectric interference layer systems on glass substrates which are otherwise transparent. Interference layer systems with respect to polarization dependency, however, have characteristics which, in the case of the edge filters described here, have been found to be disadvantageous. In order not to reflect a portion of the light back into itself, the edge filters are disposed at an angle which is inclined with respect to the optic axis. It is problematic here that because of this the reflection and transmission behavior of the interference filter becomes polarization dependent. In particular the position of the edge as well as also the reflection and transmission in the wavelength ranges adjacent to the edge depend on the polarization. In light sources operating with non-polarized or only partially polarized light, this leads to erroneous misdirection of light components. For one, this leads to a loss of light and, for another, can have an unfavorable effect on the particular color coordinates.

In the present specification the optical path which must be traversed by the blue component of the light is referred to as the blue channel. The proportion of the blue light emitted by the light source arriving at the imaging element, is referred to as the blue channel transmission. A red channel transmission and a green channel transmission are referred to correspondingly. It is understood that misdirections of light components lead to a decrease of the channel transmission.

A further important effect influencing the channel transmission is the angular emission characteristic of the light source or of the light sources. The optical elements and filters utilized for the illumination must therefore have a certain angular acceptance, which, as a rule, is expressed as the f-number. The f-number is inversely proportional to the numeric aperture (NA) defined by the product of the index of refraction of the medium and one half of the aperture angle of the illumination cone, i.e. the smaller the f-number, the greater the required angular acceptance. The effect exerted by the different angles of incidence onto the transmission characteristic of the edge filters, must also be taken into consideration in calculating the channel transmission. The position of the edge as well as also the reflection and transmission in the ranges adjoining the edge depend on the angle of incidence. In order to take this into consideration, weighted integration is carried out over the different angles of incidence. For the channel transmission this means that the initially steep edges for an angle of incidence through integration over different angles forfeit steepness and consequently, light in the edge region is misdirected.

SUMMARY OF THE INVENTION

The aim of the invention is therefore specifying a device which overcomes, or at least reduces, the disadvantages of the prior art. In particular the device according to the invention represents a solution which can be produced cost-effectively compared to prior art for an illumination system with non-polarized light for projectors.

The solution to the addressed problem comprises, in contrast to the prior art, treating the green channel located between the two adjoining wavelength intervals separately, while the red and blue light channel are still (in the case of the white light source) or already (in the case of the narrowband light sources) combined. This means that for the separation of the red light path from the blue light path, or for the combination of the red and of the blue light path, a highly simplified edge filter can be utilized, whose edge within the green wavelength interval can be nearly arbitrarily polarization dependent and/or angle dependent without significantly impairing the separation or the combination of red-blue. It is therefore even questionable whether this filter should be called an edge filter in the sense of the above provided definition. To account for this, within the scope of this specification the filter is generally referred to as an RB splitter, and specifically as an RB splitter shortpass if blue light is transmitted and red light reflected; and correspondingly, as an RB splitter longpass if blue light is reflected and red light is transmitted.

In connection with color management systems for reflective, locally polarization-modulating imaging elements, such separate treatment of the green channel is already known. However, here the color management system must propagate light, which is polarization-modulated and reflected by the imaging element, to one extent in the one polarization and to some extent in the other polarization, before a polarization-sensitive optical element converts the polarization modulation into an intensity modulation.

In contrast, no polarization-selective element is utilized in illumination configurations for imaging elements in which the polarization does not play a role. According to the present invention rather a so-called green bandpass filter is required and utilized. Such a filter can, for example, be realized thereby where on one side of a substrate, a shortpass filter is applied with the position of the edge at approximately 600 nm, while on the other side a longpass filter is applied with the position of the edge at approximately 500 nm. In this way, blue light is reflected on the side with the longpass filter and red light is reflected on the side with the shortpass filter. Only green light is transmitted through both sides of the substrate. This permits the efficient combining and/or splitting of the green light with or from light components which include red as well as also blue light. As already described above, it is advantageous here that the additional filter can be an RB splitter. In the green wavelength range, which forms the transition between the red wavelength range and the blue wavelength range, there are no specifications which have to be satisfied and therefore effects, such as polarization shift or angle shifts, do not play any role or at least they play only a subordinate one.

In an especially preferred embodiment of the present invention, the bandpass filter, however, is not realized as a two-sided one, but rather in a novel way is applied on one side of the substrate, i.e. on one side of the substrate, the bandpass filter is realized by means of a layer system. On the other side, if it is considered necessary, only an antireflection coating is provided comprising a few layers. Such single-side bandpass filters are generally considered to be difficult to produce. However, novel and substantially statistical design methods simplify this task considerably. It has unexpectedly been found that such a single-sided design with only 60% of the total thickness of a comparable two-sided design can be produced with substantially lower coating complexity and therefore much more cost-effectively.

The invention specifies a method for dividing essentially non-polarized white light into three substantially non-polarized fractions with at least the following steps:

splitting the substantially non-polarized white light into a first fraction and a second fraction, the first fraction comprising substantially non-polarized light of a first wavelength interval and the second fraction comprising substantially non-polarized light of a second and of a third wavelength interval, and the first wavelength interval is located between the second and the third wavelength interval, splitting the second fraction into a third fraction with substantially non-polarized light of the second wavelength interval and a fourth fraction with substantially non-polarized light of the third wavelength interval.

According to the invention, in addition, a method is specified for the combination of the beam paths of a first, substantially non-polarized light beam of a first wavelength interval of a first light source, a second, substantially non-polarized lightbeam of a second wavelength interval of a second light source, and a third, substantially non-polarized light beam of a third wavelength interval of a third light source, the first wavelength interval being located between the second and the third wavelength interval and the method comprising at least the following steps:

combination of the beam paths of the second light beam and of the third light beam into a first combined beam path, such that the degree of polarization of the particular light beams is substantially not affected;

combination of the beam path of the first light beam with the first combined beam path, such that the degree of polarization of the particular light beams is substantially not affected.

The specification discloses an illumination unit according to the invention comprising a first light source for emitting of a first, substantially nonpolarized light beam of a second wavelength interval, a second light source for emitting a second, substantially nonpolarized light beam of a second wavelength interval, a third light source for emitting a third, substantially non-polarized light beam of a third wavelength interval, the first wavelength interval comprising wavelengths located between the second and the third wavelength interval, and the second light source and the third light source are disposed such that the beam paths of the emitted light intersect, and in the region of the intersection a first interference filter for the combination of the beam paths to a first combined beam path is provided;

and the first light source is disposed such that the beam path of the first light source intersects the combined beam path;

and in the region of the intersection of the beam path of the first light source and of the combined beam path, a second interference filter is provided for the combination of the first beam path with the combined beam path.

DETAILED DESCRIPTION OF THE INVENTION

The invention will be explained as follows in further detail by example and in conjunction with the figures.

Figure 1A:
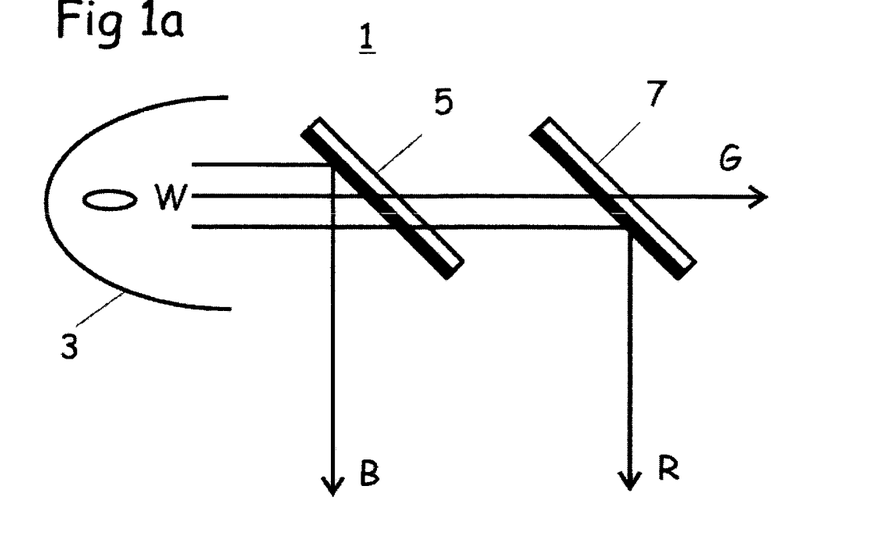
FIG. 1*a* shows an illumination unit with white light source according to the prior art with two edge filters.

FIG. 1a illustrates schematically the condition according to the prior art in the case of a white light source. In the illumination configuration 1 of FIG. 1a, a white light source is shown, which radiates white light W. A longpass filter 5 is placed downstream in the light path at an angle of 45° with the filter edge at approximately 500 nm for the reflection of blue light B and transmission of green light G and red light R. A shortpass filter 7 is placed further downstream into the light path at an orientation of 45° with edge position at approximately 600 nm, which transmits green light G and reflects red light R.

Figure 1B:
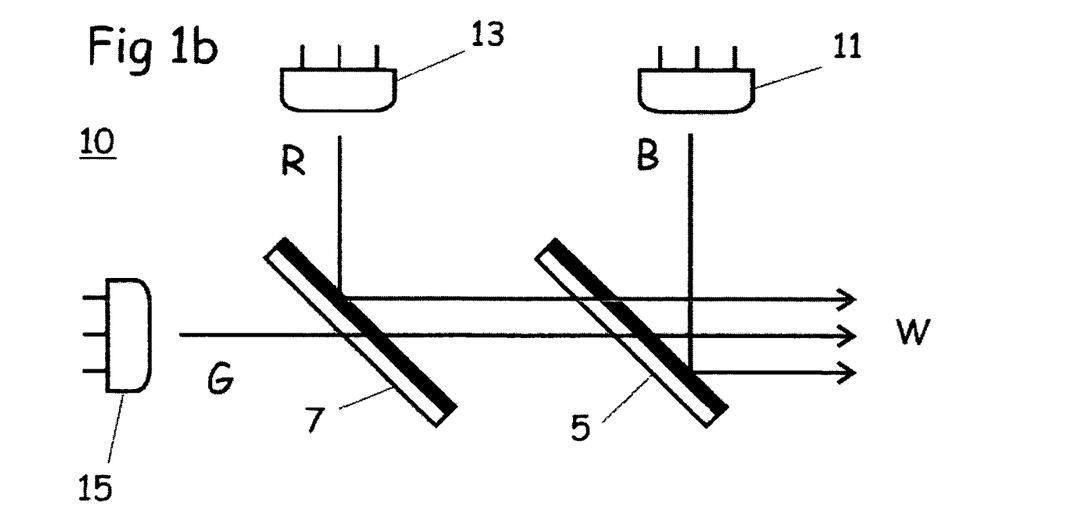
FIG. 1*b* shows an illumination unit with 3 LEDs according to the prior art with two edge filters.

FIG. 1b depicts schematically an illumination configuration 10 according to the prior art with respect to narrowband light sources to be combined. The blue LED 11, the red LED 13 and the green LED 15 are shown, whose light is combined by means of the shortpass filter 7 and the longpass filter 5.

Figure 2A:
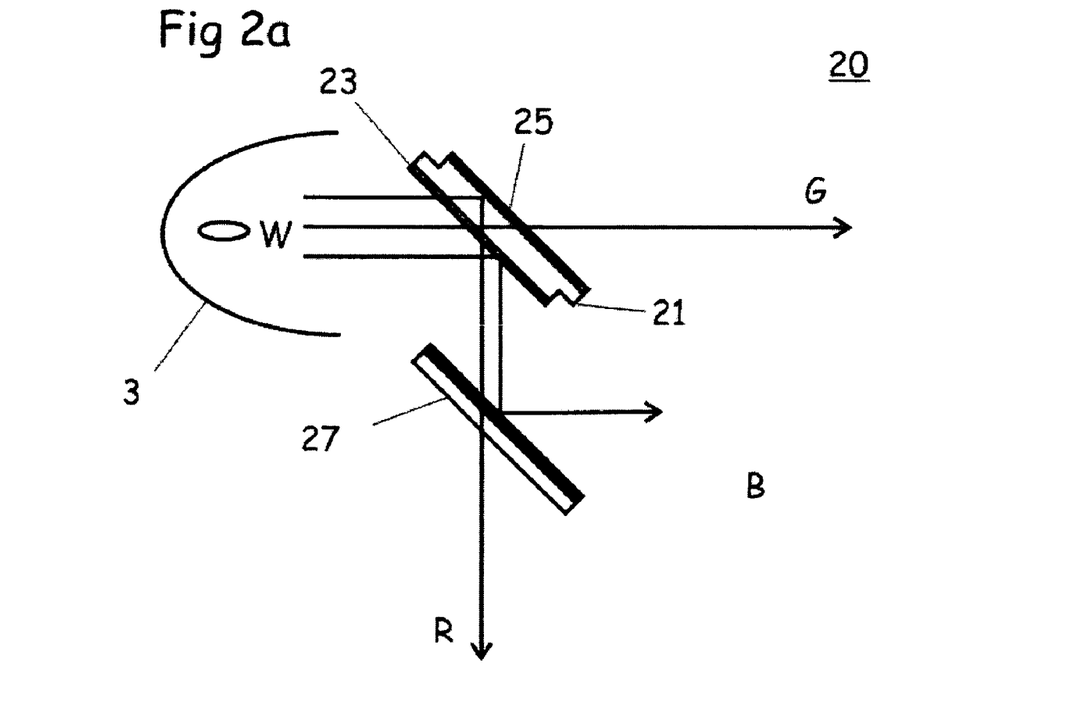
FIG. 2*a* shows an illumination unit according to the invention with a white light source, a two-sided bandpass filter, and an RB splitter.

In comparison, FIG. 2a shows an illumination configuration 20 according to the invention for 3P projectors with white light source 3. This light source could be, for example, a UHP lamp conventionally used today. A green bandpass filter 21 is placed downstream of the light source at an angle of 45°. A longpass filter 23 with its edge position at 500 nm is applied to one substrate side of the green bandpass filter. A shortpass filter 25 with its edge position at 600 nm is applied to the other side of the green bandpass filter. The bandpass filter is preferably disposed such that the longpass filter 23 faces the light source. In this way the blue light, which, as a rule, is unintentionally most strongly absorbed by thin film material, is minimally transmitted through thin film layers. Absorption effects are thereby minimized. Through this combination of a longpass filter 23 and a shortpass filter 25, a green bandpass filter 21 is produced, which reflects blue and red light and transmits green light. Downstream, following the path of the red and blue light, an RB splitter longpass is disposed, which essentially reflects blue light and transmits red light. It is understood that here, an RB splitter shortpass would also be feasible. However, for the above addressed reasons with respect to absorption of the blue light, it is in turn, advantageous to reflect the blue light. An antireflection coating can be provided on the backside of the substrate of the RB splitter.

All of the filters comprise thin film alternate layer systems of a high refractive and a low refractive layer material. In the example, $Nb_2O_5$ was used for the high refractive layer and H and $SiO_2$ for the low refractive layer L. Table 1 indicates the layer thickness distribution of the particular filters in nanometers, starting from the substrate. The sum of the total layer thickness of bandpass filter 21 is 4360 nm.

TABLE 1

| Shortpass | Longpass | RB-Splitter |
|---|---|---|
| 92.94H | 39.86H | 39.63H |
| 136.3L | 47.54L | 59.04L |
| 76.34H | 61.56H | 52.48 |
| 122.35L | 52.13L | 90.22L |
| 77.58H | 58.31H | 52.45H |
| 120.6L | 46.27L | 88.63L |
| 76.8H | 64.05H | 46.69H |
| 121.65L | 62.63L | 86.03L |
| 74.87H | 61.33H | 54.82H |
| 119.35L | 95.74L | 83.89L |
| 74.78H | 28.75H | 51.61H |
| 120.48L | 36.17L | 100.45L |
| 74.43H | 80.61H | 57.42H |
| 125.52L | 93.1L | 77.47L |
| 75.38H | 52.76H | 28.32H |
| 118.72L | 121.34L | |
| 70.95H | 31.58H | |
| 124.13L | 24.06L | RB-Splitter |
| 78.47H | 76.97H | 17H |
| 128.21L | 85.83L | 38.17L |
| 82.36H | 62.29H | 113.98H |
| 97.02L | 69.82L | 110.64L |
| 121.65H | 46.45H | |
| 138.23L | 52.64L | |
| | 55.92H | |
| | 82.46L | |
| | 47.7H | |
| | 68.64L | |
| | 33.85H | |
| | 170.52L | |

Figure 3A:
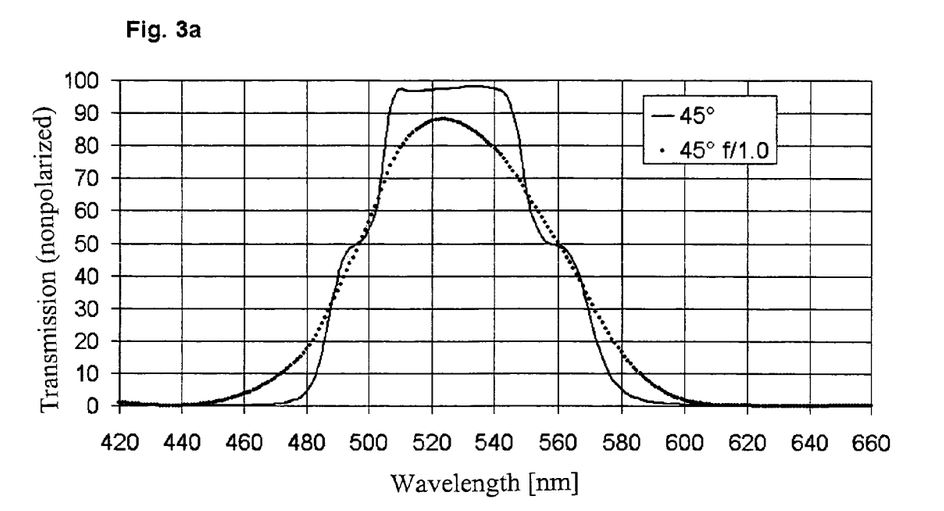
FIG. 3*a* shows a transmission spectrum of a green bandpass filter for light incident at 45° for parallel impingement as well for impingement with f-number 1.0.

FIG. 3a shows the transmission characteristic for nonpolarized light of the green bandpass filter resulting from the two-sided coating. The solid line represents the characteristic at an angle of incidence of 45°. The characteristic 'steps' at 495 nm and 560 nm are a consequence of the polarization dependence. The dotted line represents the characteristic which is obtained when the bandpass filter is impinged with an f-number of 1.0. It becomes evident here that by widening the angle spectrum, the edges are softened and thereby, for example, the transmission at the maximum decreases in comparison to the 45° case. Also as a consequence of the softening of the edges, the polarization 'steps' are absent.

Figure 3B:
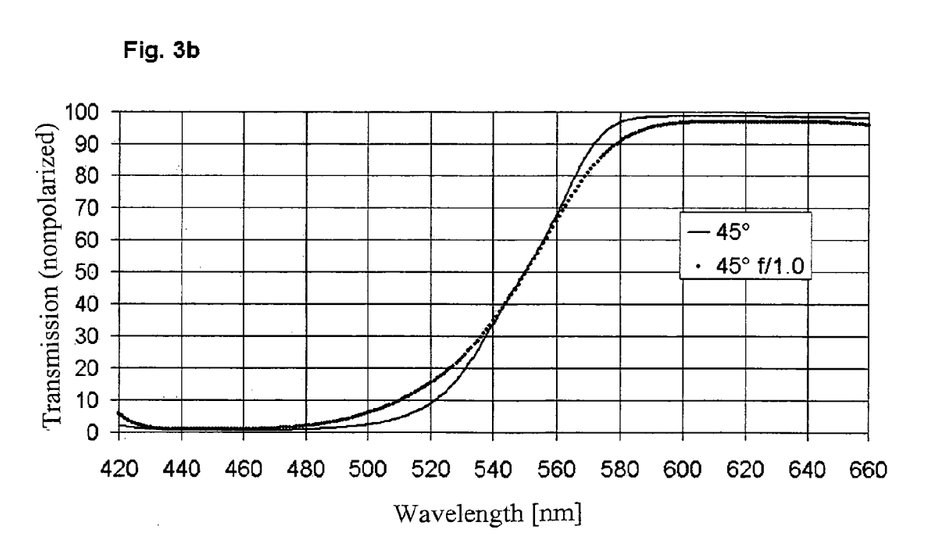
FIG. 3b shows a transmission spectrum of an RB splitter's longpass for light incident at 45° for parallel impingement as well as for impingement with f-number 1.0.

FIG. 3b shows the transmission characteristic for nonpolarized light of the RB splitter longpass for angles of incidence of 45° (solid line) and f-number 1.0 (dotted line). It is evident that in spite of the very low f-number, the resulting losses are very low. It should additionally be noted that the RB splitter is selected such that it already has a flat 'edge' at only a 45° angle of incidence. In the present case, the slope $dT/d\lambda < 2\%/nm$, where T is the transmission in percent and $\lambda$ is the wavelength of the light in nanometers.

Figure 3C:
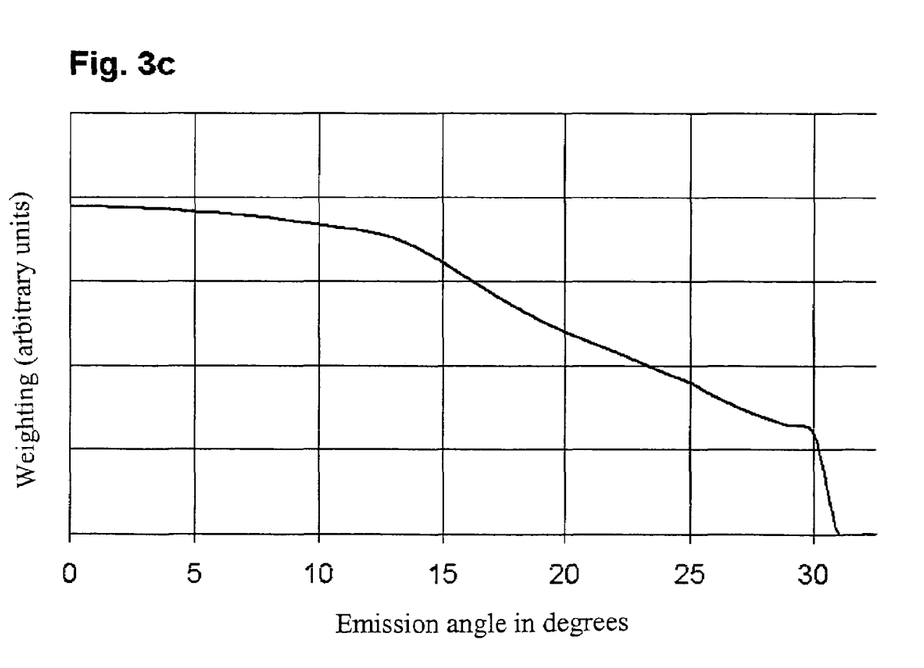
FIG. 3c shows an assumed weighting of the angles of incidence.

It is understood that providing an f-number and the transmission characteristic connected therewith is only meaningful if the way in which the angle distribution within the illumination cone was weighted is simultaneously evident. For this reason, FIG. 3c depicts the angle weighting of the different emission directions of the light source, which forms the basis for the transmission characteristic.

Figure 4A:
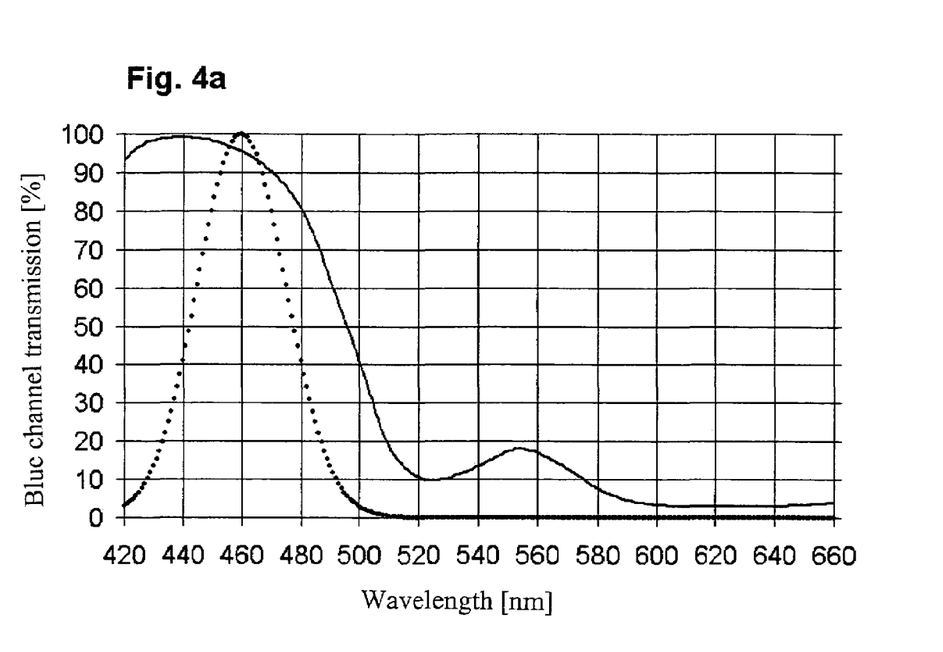
FIG. 4a shows a blue channel transmission as a function of the wavelength (solid line) as well as spectral distribution of a blue LED.
Figure 4B:
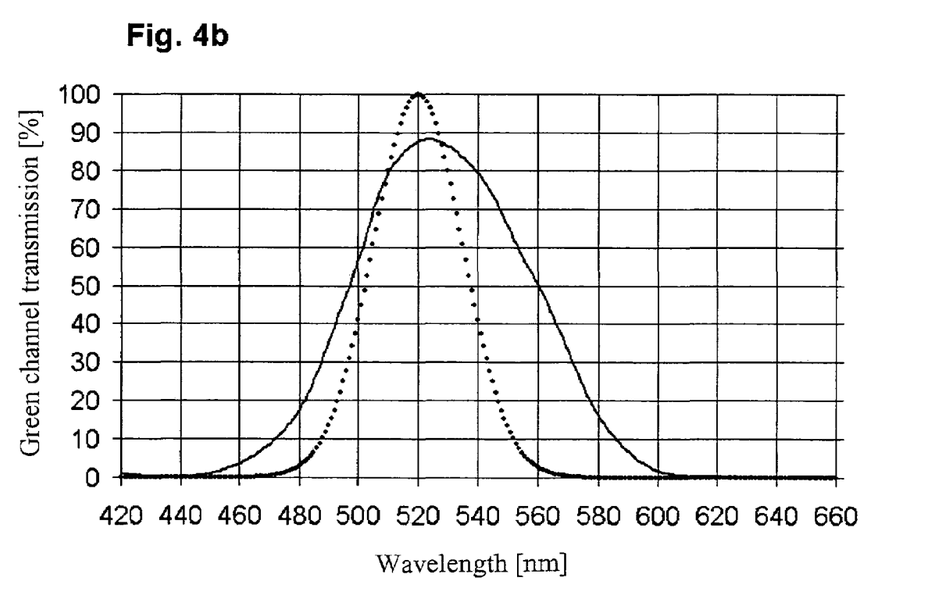
FIG. 4b shows a green channel transmission as a function of the wavelength (solid line) as well as spectral distribution of a green LED.
Figure 4C:
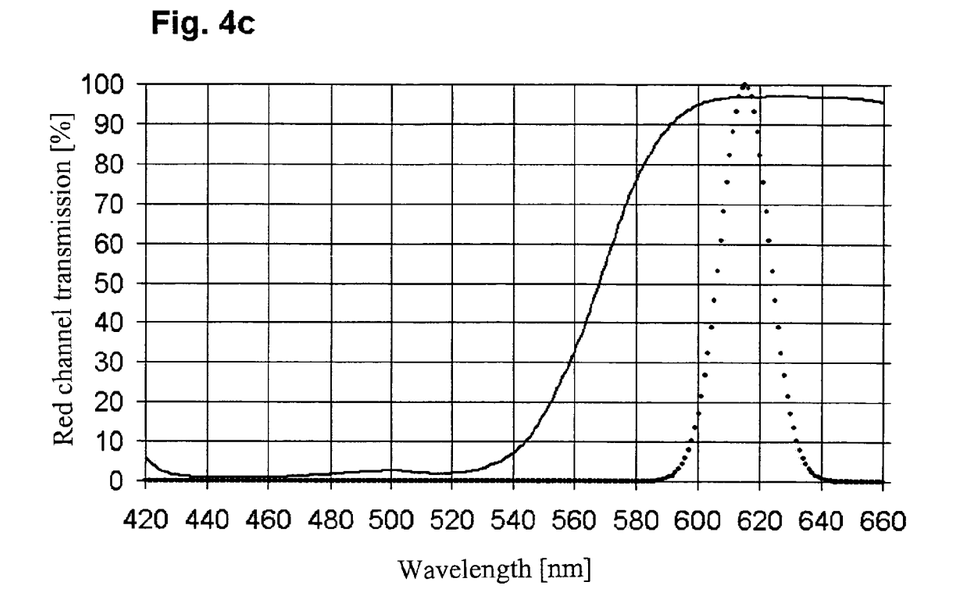
FIG. 4c shows a red channel transmission as a function of the wavelength (solid line) as well as spectral distribution of a red LED.

If the channel transmissions for blue, green and red, as depicted in FIG. 4a-c are considered, it can be seen that at an f-number of 1.0, a considerable quantity of light passes through the particular channel, i.e. the light loss is kept within narrow limits. However, additional measures must be taken in order to trim the color channels. Especially in the blue channel FIG. 4a, it becomes evident that, for example, green light fractions with a maximum at 560 nm must be blocked by means of a trimming filter. However, since the color splitting has already taken place, such a trimming filter can be disposed substantially perpendicularly to the beam path and succeeding the RB splitter. Simple trimming filters can be utilized for the red channel and the blue channel analogously.

Figure 2B:
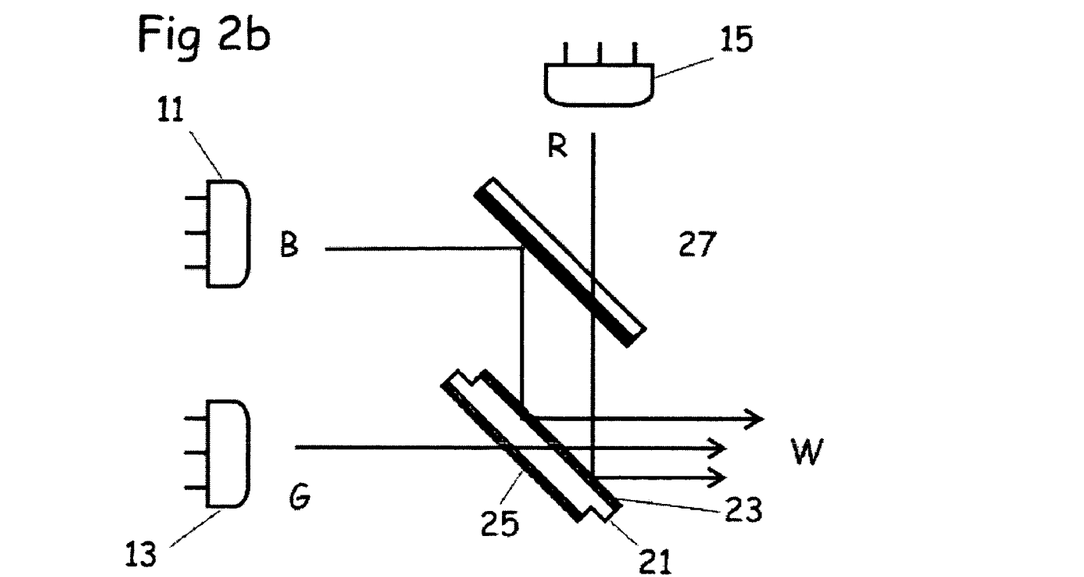
FIG. 2*b* shows an illumination unit according to the invention building on LEDs with a two-sided bandpass filter and an RB splitter.
Figure 5A:
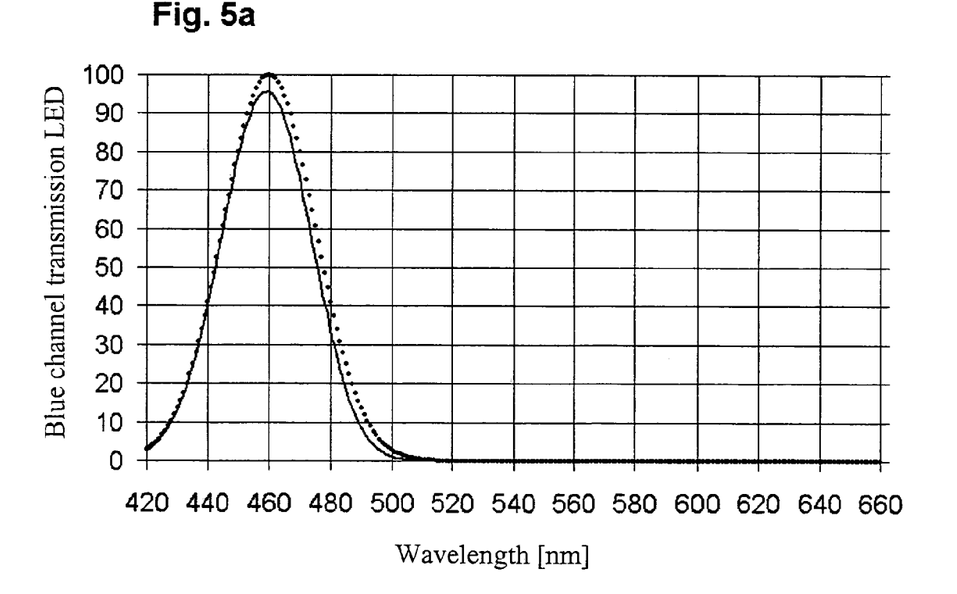
FIG. 5a shows a blue channel transmission under LED illumination
Figure 5B:
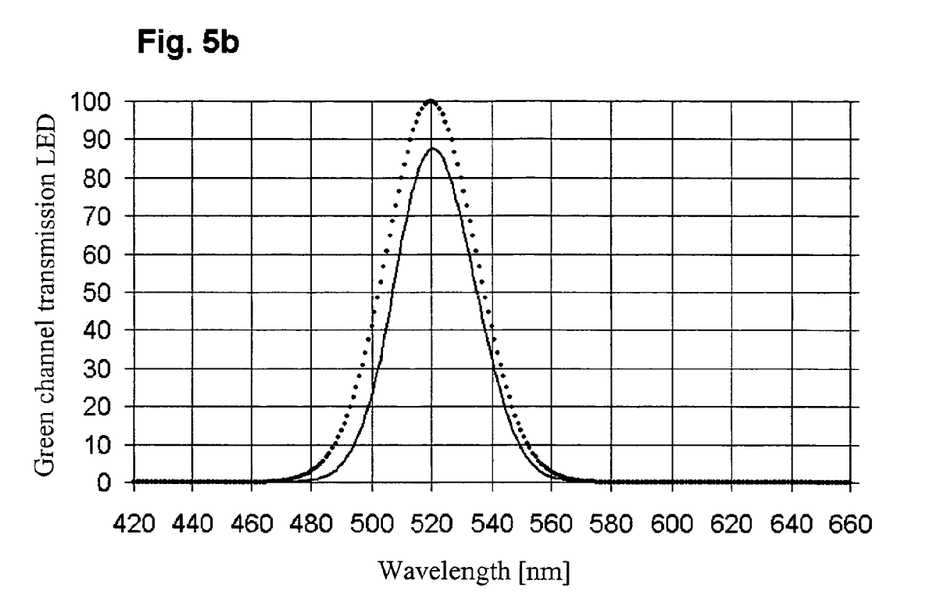
FIG. 5b shows a green channel transmission under LED illumination.
Figure 5C:
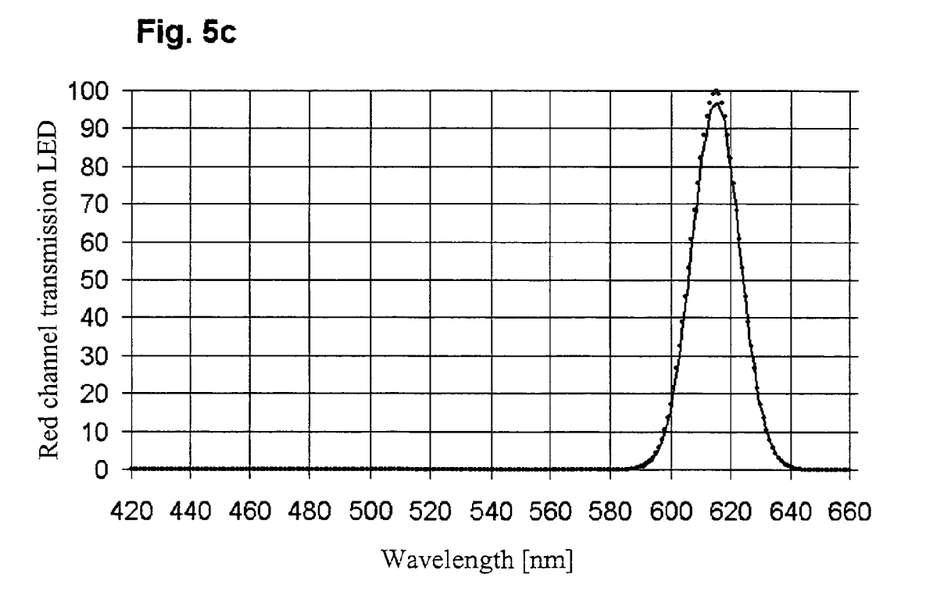
FIG. 5c shows a red channel transmission under LED illumination.

According to FIG. 2b, corresponding bandpass filter 21 and RB longpass 27 are utilized in an illumination configuration for the combination of light of a blue LED 11, a green LED 13 and a red LED 15. Neglecting the emission spectrum of the light-emitting diodes, substantially the same channel transmission is obtained as represented in FIG. 4a-c by the solid line. However, FIG. 4a-c additionally show with the dotted lines the spectral distribution of the LED associated with the color channel. To determine the magnitude of light which is, in fact, combined with white light, these spectral distributions must be multiplied by the channel transmission curves. The results are shown in FIG. 5a-c. The dotted line indicates again the particular emission spectrum of the LEDs and the solid line indicates the color channel transmission connected therewith. Based on the figures it is evident that nearly the entire light energy radiated by the LEDs supplied into the channels is transmitted by the particular color channel.

Figure 6:
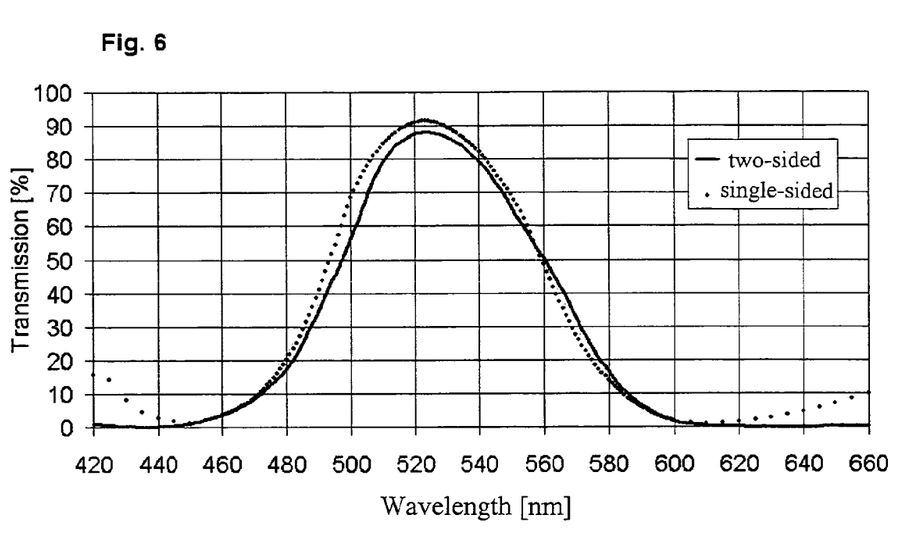
FIG. 6 shows a comparison of the transmissions through bandpass filters, single-sided (dotted line) and two-sided (solid line), bandpass filters.

In an especially preferred embodiment of the present invention, the green bandpass filter is realized with a single-sided design. Table 2 below reproduces the layer structure of the single-sided bandpass filter. On the other side of the substrate an antireflection coating is provided. The sum of the total layer thickness including the layers for the antireflection coating is only 2568 nm and therewith accounts for only 60% of the layer thickness of the two-sided bandpass system which is remarkable in this embodiment. In FIG. 6, the transmission curves for the single-sided and the two-sided design for the f-number 1.0 are compared. The broken line refers to the single-sided design and the solid line refers to the two-sided design. In the regions in which the considered LEDs have their emission maximum, these filters are equivalent within 2-5%. The single-sided design appears to be even slightly better in the green channel.

TABLE 2

| AR | BP |
|---|---|
| 17H | 70.52H |
| 26.37L | 136.55L |
| 88.17H | 102.65H |
| 96.49L | 106.3L |
| | 48.63H |
| | 89.18L |
| | 71.9H |
| | 196.53L |
| | 55.46H |
| | 101.21L |
| | 57.3H |
| | 112.9L |
| | 77.83H |
| | 26.2L |
| | 28.8H |

TABLE 2-continued

| AR | BP |
|---|---|
| | 63.46L |
| | 69.52H |
| | 101.73L |
| | 55.67H |
| | 110.19L |
| | 40.7H |
| | 27.2L |
| | 37.91H |
| | 131.19L |
| | 63.15H |
| | 102.04L |
| | 45.73H |
| | 60.55L |
| | 36.98H |
| | 81.58L |
| | 30.02H |

Figure 7:
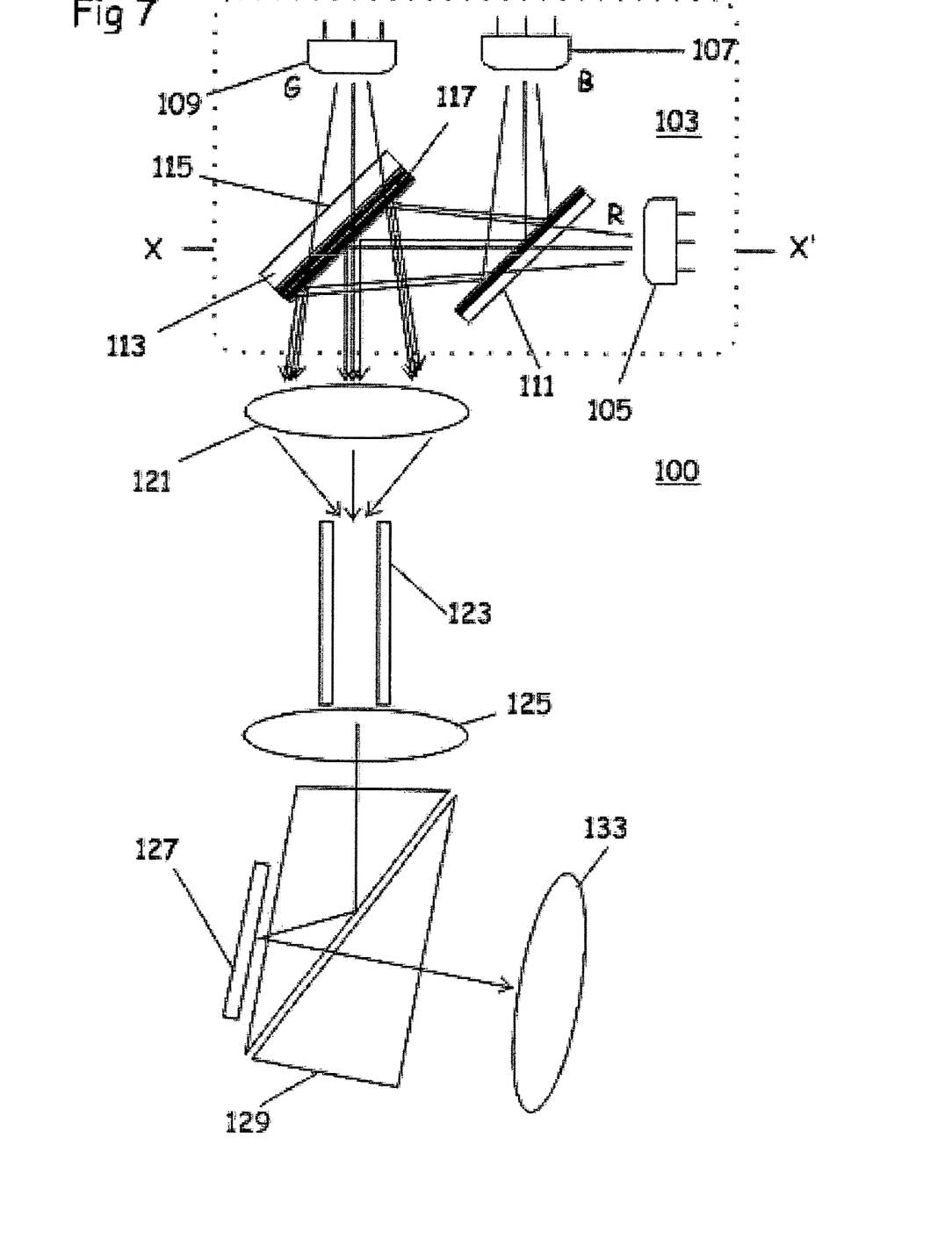
FIG. 7 shows a schematic structure of a projector with LED illumination unit according to the invention.

FIG. 7 outlines a projector 100 based on 3 LEDs, which includes an illumination unit 103 according to the invention. Structural components of the illumination unit 103 are at least one red LED 105, at least one blue LED 107 and at least one green LED 109. In a 45° configuration, as depicted here, the green LED 109 and the blue LED 107 are oriented substantially parallel, while the red LED 105 is oriented perpendicularly thereto. An RB splitter longpass 111 is a further structural component. Differing from the depiction in FIG. 7, it is feasible to dispose the blue LED 107, and, correspondingly, the RB splitter longpass 111, such that it is rotated arbitrarily about the axis XX'. This can be advantageous in some cases, for example for reasons of space. In addition, it is possible for the red and the blue to deviate from the 45° geometry and to change, for example, to 30°. The polarization effect is thereby decreased and the production of the RB splitter is even further simplified. A significant structural component of the illumination unit 103 is the bandpass filter 113. The bandpass filter 113 depicted here comprises one substrate side facing the green LED, which includes an antireflection coating 115 and one bandpass filter layer system 117. Due to this configuration, the blue light is reflected directly on the surface without the need for it to be propagated through the substrate. Since predominantly shortwave light is typically absorbed in the substrate, the absorption can be minimized through such a configuration. A further source for absorption losses are the layers required for the structuring of the layer system 117 themselves. In determining the bandpass filter layer system 117, a static thin film optimization program can advantageously be utilized. If care is taken during the determination that blue light is, as much as possible, already largely reflected on the outermost layers, this approach again counteracts the absorption.

After the illumination unit, the optical paths of the beam of the 3 LEDs are identical. A lens 121 is disposed downstream in the optical paths, which are now a common path. The lens 121 focuses the light into the integrator 123. Conventionally, means for color sequencing such as for example a color wheel would be provided in front of the input of the integrator. However, if the LEDs can be rapidly switched on and off, a color wheel is not required. At the output end of the integrator 123, a homogeneous light field is available which is projected by means of lens 125 onto a DMD chip 127. A prism 129 is disposed on the path between the lens 125 and the imaging element DMD chip 127. The DMD chip 127 comprises a matrix of individually addressable movable mirrors. Depending on the position of these mirrors, the light reflected on the mirror is directed through the prism 127 to the projection lens 133 or it is reflected away from the projection lens. An image can be produced in this way.

In FIG. 7, starting from the light sources, several emission angles were drawn for the purpose of elucidation. Downstream, these angles were omitted starting from the integrator, and only the central beam along the optic axis was drawn in.

Within the scope of the present specification, illumination units for a projector were introduced, which essentially operate with nonpolarized light. However, it is evident that the application of the invention is not limited to projectors only. The present invention can advantageously be utilized wherever nonpolarized light, possibly with a broad angle distribution, must be split and/or joined with respect to wavelengths intervals.

The invention claimed is:

1. Method for the combination of beam paths of a first, substantially nonpolarized light beam of a first wavelength interval of a first light source, of a second, substantially nonpolarized light beam of a second wavelength interval of a second light source and of a third, substantially nonpolarized light beam of a third wavelength interval of a third light source, the first wavelength interval being located between the second and the third wavelength interval and the method comprising the steps of:

combining the beam paths of the second light beam and of the third light beam to a first combined beam path, such that substantially the degree of polarization of the particular light beams is not affected; and combining the beam path of the first light beam with the first combined beam path, such that the degree of polarization of the particular light beams is not substantially affected;

wherein, for the combination of the beam paths of the second and of the third light beam, the light sources are oriented such that the beam paths of the second and of the third light beam intersect and in the region of the intersection an interference filter is placed, which transmits the second light beam and reflects the third light beam.

2. Method as claimed in claim 1, characterized in that for the combination of the beam path of the first light beam and of the first combined beam path the first light source is oriented such that the beam path of the first light intersects the first combined beam path and in the region of the intersection a further interference filter is placed, which reflects the second and the third light beam and transmits the first light beam.

3. Method as claimed in claim 2, characterized in that on the further interference filter those layers of the interference filter which substantially ensure the reflection of the second light beam and of the third light beam, are jointly supported on one side of a substrate.

4. Illumination unit comprising:

a first light source for the emission of a first substantially nonpolarized light beam of a first wavelength interval, a second light source for the emission of a second substantially nonpolarized light beam of a second wavelength interval, a third light source for the emission of a third substantially nonpolarized light beam of a third wavelength interval, the first wavelength interval comprising wavelengths located between the second and the third wavelength interval, and the second light source and the third light source are disposed such that the beam paths of the emitted light intersect, and in the region of the intersection a first interference filter is provided for the combination of the beam paths into a first combined beam path;

and the first light source is disposed such that the beam path of the first light source intersects the combined beam path;

and in the region of the intersection of the beam path of the first light source and of the combined beam path a second interference filter is provided for the combination of the first beam path with the combined beam path.

5. Illumination unit as claimed in claim 4, characterized in that the second interference filter substantially transmits light of the first light source and substantially completely reflects light of the second and of the third light source.

6. Illumination unit as claimed in claim 4, characterized in that the layers of the interference filter provided for the reflection of the light of the second light source and of the third light source are supported substantially on one side of a substrate.

* * * * *